United States Patent
Teramoto et al.

(10) Patent No.: US 8,733,198 B2
(45) Date of Patent: May 27, 2014

(54) HELICAL GEAR AND POWER TRANSMISSION APPARATUS

(75) Inventors: Takayuki Teramoto, Toyota (JP); Kazuhiko Murakoshi, Anjo (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 148 days.

(21) Appl. No.: 13/391,176

(22) PCT Filed: Jun. 23, 2011

(86) PCT No.: PCT/JP2011/064412
§ 371 (c)(1),
(2), (4) Date: Feb. 17, 2012

(87) PCT Pub. No.: WO2012/176304
PCT Pub. Date: Dec. 27, 2012

(65) Prior Publication Data
US 2012/0325037 A1    Dec. 27, 2012

(51) Int. Cl.
*F16H 55/17*    (2006.01)
*F16H 55/12*    (2006.01)

(52) U.S. Cl.
USPC .............................................. 74/446; 74/434

(58) Field of Classification Search
USPC ..................... 74/434, 443, 446, 448
See application file for complete search history.

(56) References Cited

U.S. PATENT DOCUMENTS

| | | | | |
|---|---|---|---|---|
| 1,163,926 | A | * 12/1915 | Hudson | ............................ 74/443 |
| 5,347,880 | A | * 9/1994 | Kallenberger | .................. 74/447 |
| 5,657,666 | A | 8/1997 | Tsuda et al. | |
| 5,852,951 | A | * 12/1998 | Santi | ................................ 74/443 |
| 2010/0326224 | A1 | 12/2010 | Shimizu | |

FOREIGN PATENT DOCUMENTS

| | | |
|---|---|---|
| JP | 4-327056 A | 11/1992 |
| JP | 8-121574 A | 5/1996 |
| JP | 2005-69401 A | 3/2005 |
| JP | 2005-325865 A | 11/2005 |
| JP | 2008-303968 A | 12/2008 |
| JP | 2009-216153 A | 9/2009 |
| JP | 2009-228741 A | 10/2009 |
| JP | 2010-101334 A | 5/2010 |

* cited by examiner

*Primary Examiner* — Justin Krause
(74) *Attorney, Agent, or Firm* — Sughrue Mion, PLLC

(57) ABSTRACT

As to a distance in a radial direction of a rotation shaft from a rim at the hub side to an outer peripheral side face, the outer peripheral side face includes a first side region having a distance located at the most leading end side spot in the direction of rotation of a helical gear longer than a distance at a tail end side spot.

6 Claims, 14 Drawing Sheets

HELICAL GEAR AND POWER TRANSMISSION APPARATUS

CROSS REFERENCE TO RELATED APPLICATIONS

This application is a National Stage of International Application No. PCT/JP2011/064412 filed on Jun. 23, 2011, the contents of all of which are incorporated herein by reference in their entirety.

TECHNICAL FIELD

The present invention relates to a helical gear and a power transmission apparatus.

BACKGROUND ART

FIGS. 12 and 13 show a schematic configuration of a helical gear 21Z. FIGS. 12 and 13 depict the manner of the teeth oblique (inclined) at the meshing site of the gear. The degree of obliquity is depicted in an exaggerated manner for the sake of understanding.

Helical gear 21Z includes a hub 22a mounted on a rotation shaft, a disk 22b extending outward in the radial direction of the rotation shaft from hub 22a, and a rim 22c provided at the outer side of disk 22b. Teeth 22d oblique relative to the direction of rotation (R) of the gear is provided at the outer peripheral face of rim 22c.

Helical gear 21Z has the teeth oblique to the direction of rotation of the gear. Accordingly, the engaging torque is dispersed in a direction crossing the direction of rotation of the teeth (thrust direction (S direction in FIG. 13)) to suppress noise with little variation in torque. However, as shown in FIG. 13, dispersion of torque causes helical gear 21Z to incline towards the thrust direction (S direction), whereby vibration and noise increase. Therefore, sufficient suppression of vibration and noise cannot be expected.

The gear disclosed in Japanese Patent Laying-Open Nos. 2009-228741, 2010-101334, 2008-303968, 2005-325865 and 2005-069401 have the vibration and noise suppressed by providing a through hole in the disk of the gear and devising the rigidity of the disk.

CITATION LIST

Patent Literature

PTL 1: Japanese Patent Laying-Open No. 2009-228741
PTL 2: Japanese Patent Laying-Open No. 2010-101334
PTL 3: Japanese Patent Laying-Open No. 2008-303968
PTL 4: Japanese Patent Laying-Open No. 2005-325865
PTL 5: Japanese Patent Laying-Open No. 2005-069401

SUMMARY OF INVENTION

Technical Problem

FIGS. 14 and 15 show a schematic configuration of a helical gear 21Y. FIGS. 14 and 15 depict the manner of the teeth oblique (inclined) at the meshing site of the gear. The degree of obliquity is depicted in an exaggerated manner for the sake of understanding.

Helical gear 21Y includes a plurality of through holes H21 at disk 22b, extending in the circumferential direction about the rotation shaft. By altering the rigidity along the circumferential direction of disk 22b at the region between hub 22a and rim 22c, helical gear 21Z can be made to tilt greatly towards the thrust direction, as shown in FIG. 15. Thus, increase in vibration and noise is suppressed.

In view of hub 22a from rim 22c in the radial direction of the rotation shaft, the rigidity varies abruptly between the region of disk 22b where through hole H21 is not formed and the region of disk 22b where through hole H21 is formed.

Therefore, at the leading end side of through hole H21 in the direction of rotation of helical gear 21Y (the most leading end side (the region surrounded by A1 in FIG. 14) in direction of rotation R1), the stress generated at disk 22b significantly increases, leading to the possibility of insufficient strength in rim 22c at the mesh advancing direction side of through hole H21. In the case where the thickness of disk 22b is increased, for example, to overcome this insufficient strength, the rigidity will become higher, leading to the possibility of more vibration and noise.

In view of the problem set forth above, the present invention is directed to providing a helical gear and a power transmission apparatus based on a configuration in which vibration and noise are suppressed, and the stress at the leading end side in the direction of rotation of a through hole provided at a disk can be reduced.

Solution to Problem

A helical gear according to the present invention includes a hub mounted on a rotation shaft, a disk extending from the hub towards an outer side in a radial direction of the rotation shaft, and a rim provided at the outer side of the disk. The rim includes a plurality of teeth at the outer peripheral face. The disk includes a plurality of opening perimeter walls defining through holes provided along the perimeter of the hub.

The opening perimeter wall includes an inner peripheral side face located at the hub side, an outer peripheral side face located at the side closer to the rim than the inner peripheral side face, a first end side face joining one end of the inner peripheral side face and one end of the outer peripheral side face, and a second end side face joining the other end of the inner peripheral side face and the other end of the outer peripheral side face.

The outer peripheral side face includes a first side region and a second side region located at a tail end side in the direction of rotation of the helical gear relative to the first side region. As to the distance in the radial direction of the rotation shaft from the rim at the hub side to the outer peripheral side face, the first side region has the distance set greatest at the most leading end side spot in the direction of rotation of the helical gear.

In another manner, the first side region and second side region are provided continuously through an intersection. The first side region and the second side region are provided bilaterally symmetric about the intersection.

In another manner, the first side region is provided with a curved shape.

In another manner, the first side region is provided with a linear shape.

A power transmission apparatus according to the present invention includes a helical gear set forth above.

Advantageous Effects of Invention

According to a helical gear and a power transmission apparatus of the present invention, there can be provided a helical gear and a power transmission apparatus based on a configuration in which vibration and noise are suppressed, and stress generated at the leading end side in the direction of rotation of a through hole provided at a disk can be reduced.

DESCRIPTION OF EMBODIMENTS

Figure 1:
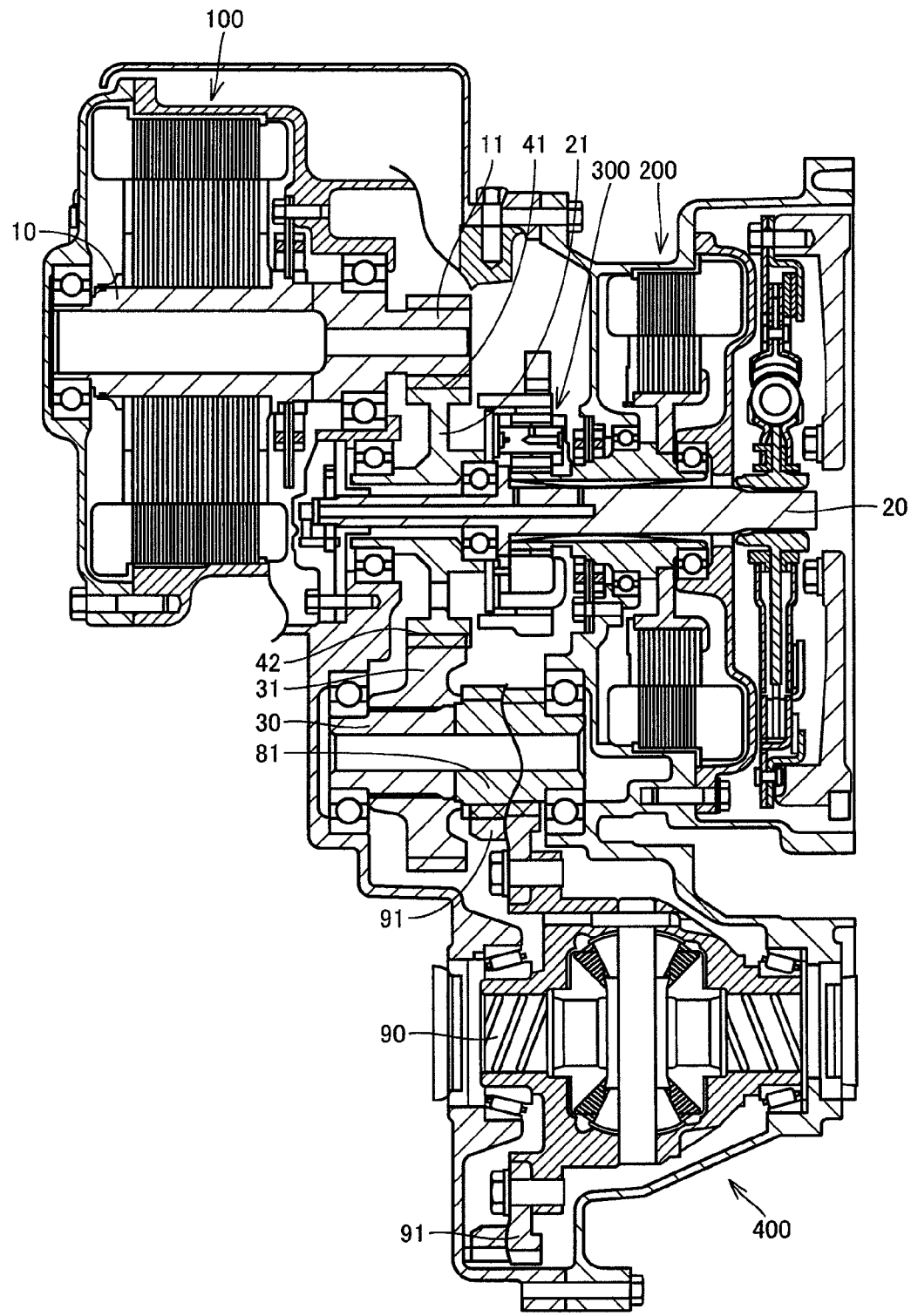
FIG. 1 is a sectional view of a configuration of a transaxle (power transmission apparatus), having a transmission with a helical gear according to an embodiment of the present invention and an axle formed integrally.

Embodiments of the present invention will be described hereinafter with reference to the drawings. In the drawings, the same or corresponding elements have the same reference characters allotted, and description thereof will not be repeated.

In the embodiment set forth below, each of the constituent elements is not necessarily mandatory in the present invention unless otherwise noted. Furthermore, the reference to the number, amount, and the like in the embodiments set forth below is only a way of example, unless otherwise particularly stated. The scope of the present invention is not limited to the cited number, amount, and the like.

FIG. 1 is a sectional view of a configuration of a transaxle having a transmission with a gear device to which a helical gear of the present embodiment is employed and an axle formed integrally. The transmission shown in FIG. 1 is employed in a front-wheel drive type hybrid vehicle.

Referring to FIG. 1, the transaxle includes rotating electric machines 100 and 200, a planetary gear 300 for power splitting, and a differential mechanism 400. Rotating electric machines 100 and 200, planetary gear 300, and differential mechanism 400 are provided in a housing.

Rotating electric machine 100 includes a rotation shaft 10 as a first shaft, provided rotatable with respect to the housing. Rotating electric machine 200 includes a rotation shaft 20 as a second shaft, provided rotatable with respect to the housing. Rotating electric machines 100 and 200 include a stator core formed by a stacked layer of electromagnetic steel plates, and a stator coil wound around the stator core. The stator coil has a terminal connected to a feed cable from an external power supply to establish electrical connection with the external power supply and the stator coil.

Planetary gear 300 is connected to rotation shaft 20. Planetary gear 300 splits the engine power transmitted via rotation shaft 20 to rotation shaft 10 and a rotation shaft 30 qualified as a third shaft for transmission.

Differential mechanism 400 includes a final driven gear 91. Final driven gear 91 is connected to rotation shaft 30 through final drive gear 81. Differential unit 90 receiving the power transmitted from rotation shaft 30 transmits equal driving power to both wheels while changing the rotating speed of the left and right wheels at the time of turning.

Thus, the transaxle shown in FIG. 1 functions as a power transmission apparatus transmitting the rotary driving force applied through the motor and the crankshaft of engine for output to the drive wheel.

The transaxle employs a gear device of a 3-shaft structure including a gear with two meshing sites for the transmission providing the motor power and engine power to realize downsizing, weight saving, and low cost.

Rotation shaft 10 has first gear 11 provided. Rotation shaft 20 has second gear 21 provided. Rotation shaft 30 has third gear 31 provided. A helical gear is used for each of first gear 11, second gear 21 and third gear 31.

Figure 2:
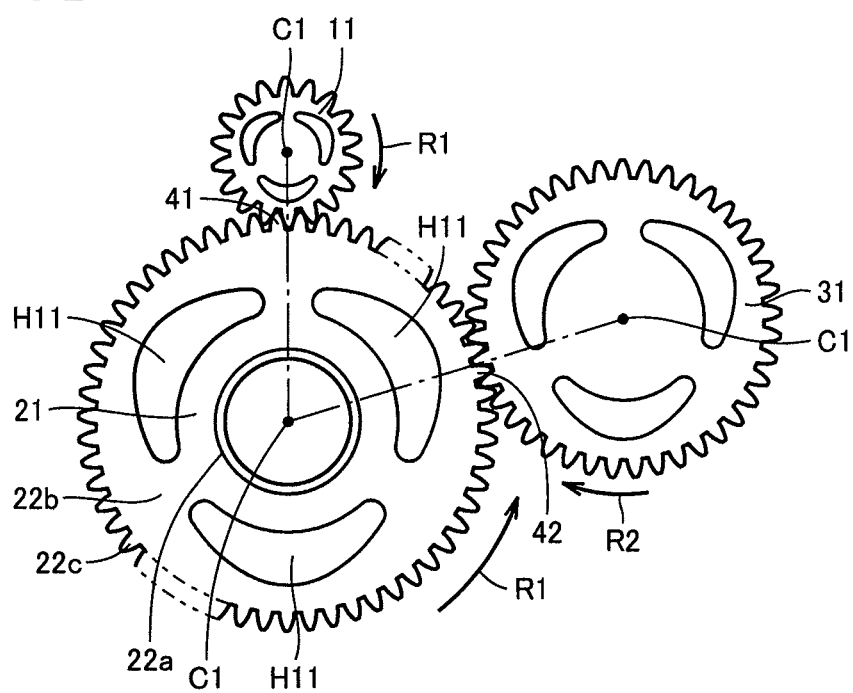
FIG. 2 is a schematic diagram showing the meshing state of a gear device of a 3-shaft structure, including a helical gear of the present embodiment.

FIG. 2 schematically represents a meshing state of the gear device of a 3-shaft structure. As shown in FIG. 2, first gear 11 and second gear 21 mesh with each other at a meshing point 41. Second gear 21 and third gear 31 mesh with each other at a meshing point 42. The power transmission apparatus includes a gear device with first gear 11, second gear 21 and third gear 31. Meshing point 41 is where first gear 11 meshes with second gear 21. Meshing point 42 is where second gear 21 meshes with third gear 31.

Figure 3:
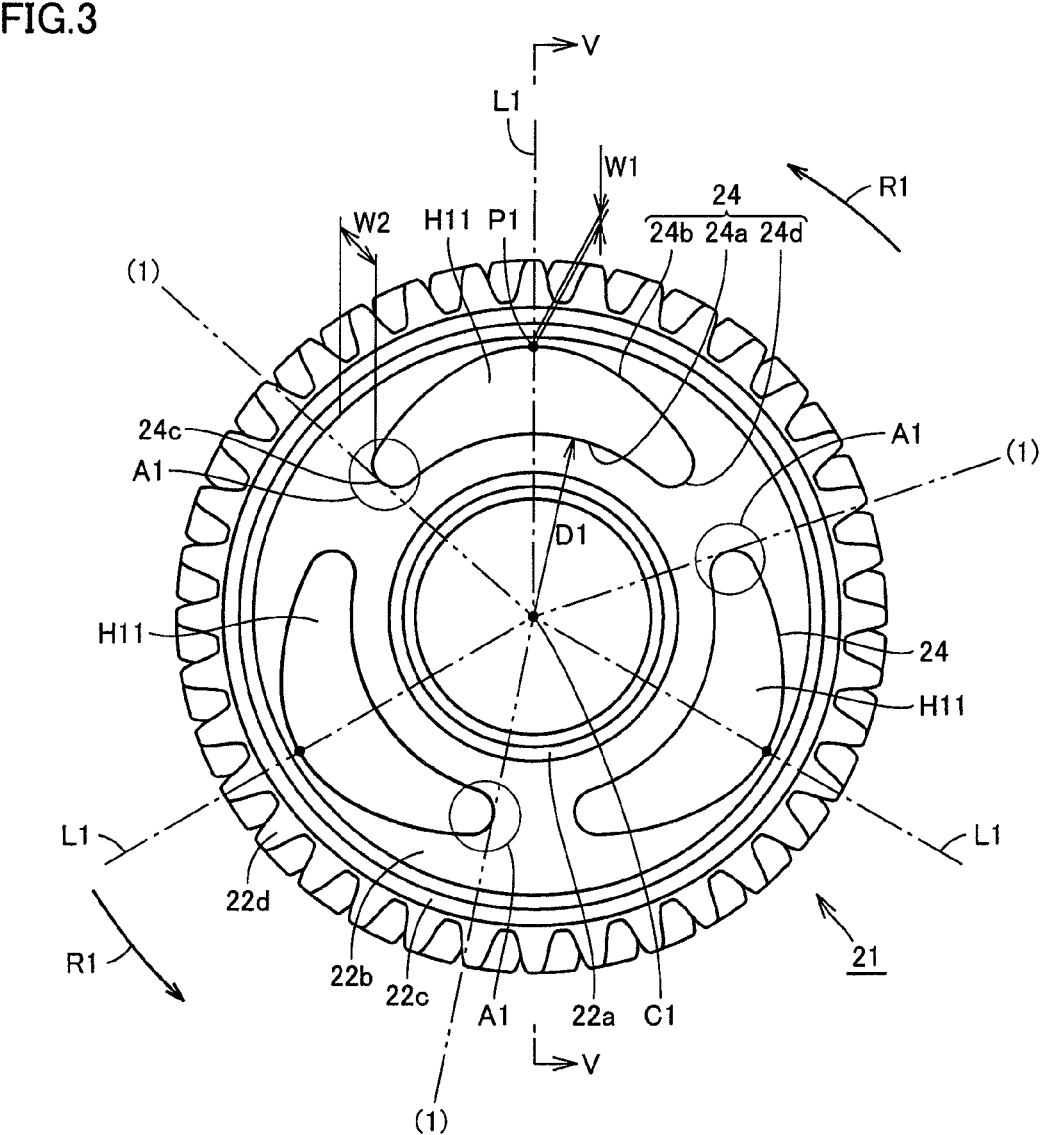
FIG. 3 represents a front view of a helical gear of the present embodiment.
Figure 4:
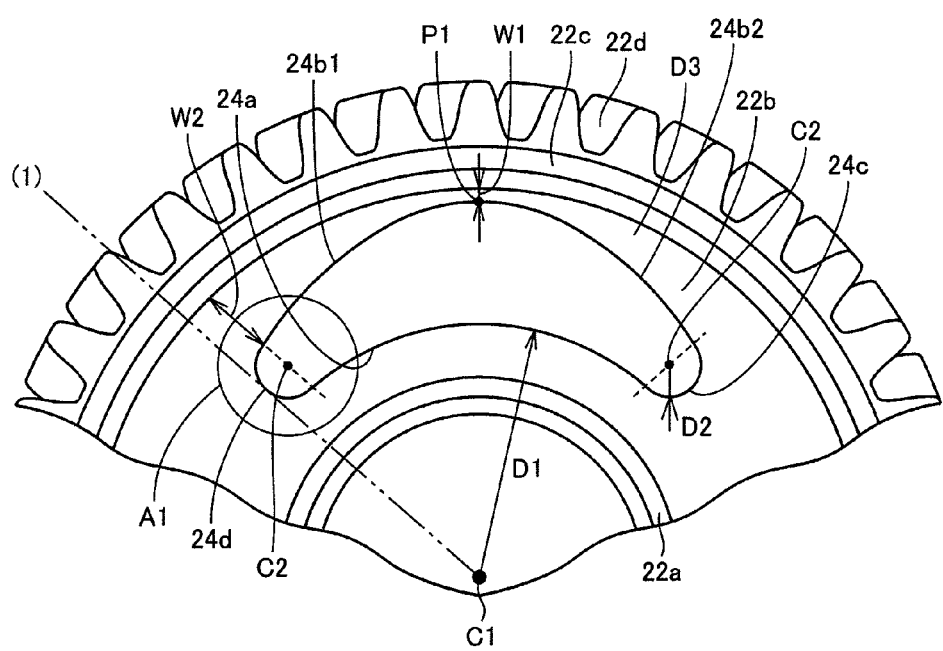
FIG. 4 is a partial enlarged plan view of a helical gear according to the present embodiment.
Figure 5:
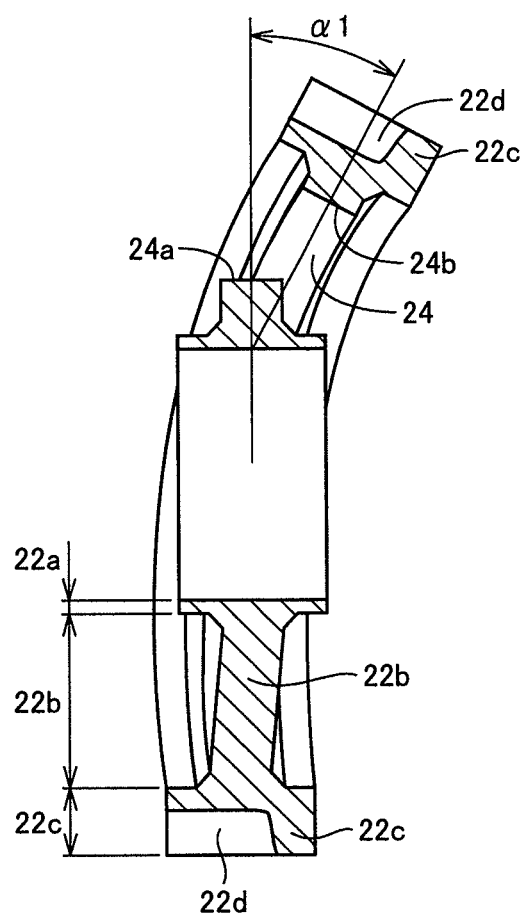
FIG. 5 is a sectional view representing deformation in the helical gear in a meshing state corresponding to arrow V-V in FIG. 3.

A detailed configuration of helical gear 21 functioning as the second gear will be described with reference to FIGS. 3-5. FIGS. 3 and 4 are a front view and a partial enlarged plan view, respectively, of helical gear 21 of the present embodiment. FIG. 5 is a sectional view representing deformation in helical gear 21 in a meshing state corresponding to arrow V-V of FIG. 3. A helical gear similar to that of the present embodiment is preferably employed as the helical gears for first gear 11 and third gear 31.

Helical gear 21 includes a hub 22a mounted on a rotation shaft 20, a disk 22b extending from hub 22a towards the outer side in a radial direction of rotation shaft 20, and a rim 22c provided at the outer side of disk 22b. Rim 22c includes a plurality of teeth 22d at its outer peripheral face.

Disk 22b includes an opening perimeter wall 24 defining a through hole H11 that is provided along the perimeter of hub 22a. In the present embodiment, opening perimeter wall 24 is provided at three sites at the pitch of 120°.

Opening perimeter wall 24 of the present embodiment includes an inner peripheral side face 24a located at the hub 22a side, an outer peripheral side face 24b located at the side closer to rim 22c than inner peripheral side face 24a, a first end side face 24c joining one end of inner peripheral side face 24a and one end of outer peripheral side face 24b, and a second end side face 24d joining the other end of inner peripheral side face 24a and the other end of outer peripheral side face 24b.

Inner peripheral side face 24a constitutes a portion of an arc having a diameter (D1) about a rotation center C1 of rotation shaft 20 (also the center of hub 22a). First end side face 24c and second end side face 24d constitute a semicircle having a radius (D2) about a rotation center C2.

Outer peripheral side face 24b includes a first side region 24b1. As to the distance in the radial direction of the rotation shaft from rim 22c at the hub 22a side to outer peripheral side face 24b, first side region 24b1 has the distance (W2) located at the most leading end side in the direction of rotation (R1) of helical gear 21 (the side closest to line (1) in the region surrounded by A1 in the drawing) set longer than the distance (W1) at intersection (P1) at the tail end side. First side region 24b1 has a curved shape that is convex towards the rim 22c side.

Outer peripheral side face 24b of the present embodiment includes a second side region 24b2 located at the tail end side in the direction of rotation (R1) of helical gear 21 relative to first side region 24b1. Second side region 24b2 is provided continuous to first side region 24b1 through intersection P1. First side region 24b1 and second side region 24b2 are provided bilaterally symmetric about the intersection (P1). Therefore, through hole H11 defined by opening perimeter wall 24 has a bilateral symmetric configuration about a phantom straight line (L1) connecting rotation center C1 and the intersection (P1).

Figure 6:
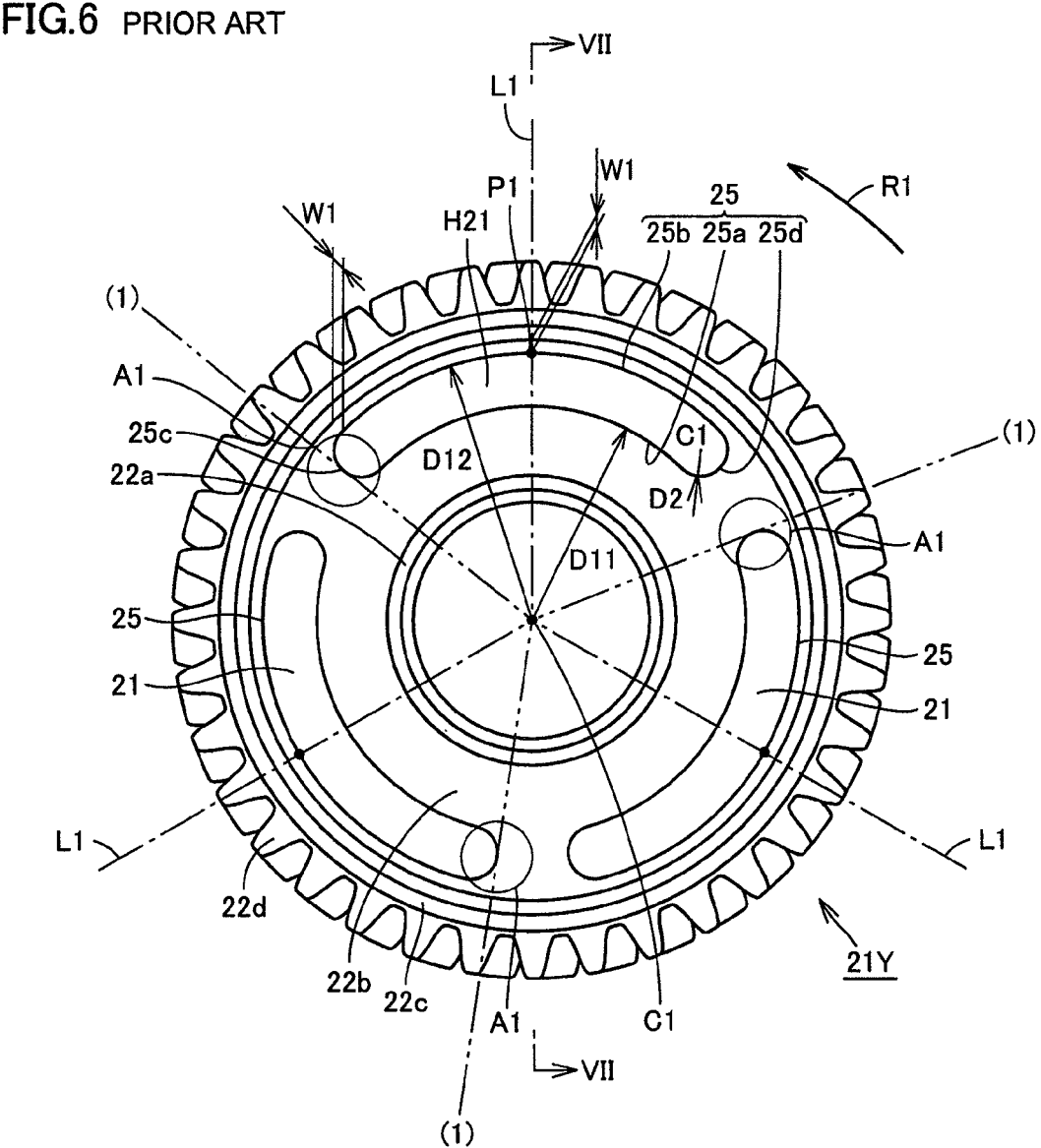
FIG. 6 is a front view of a helical gear according to background art.
Figure 7:
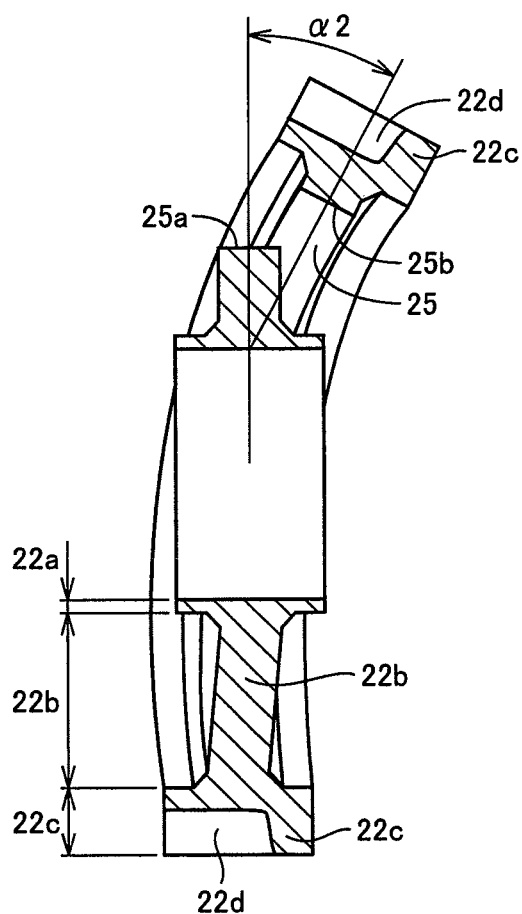
FIG. 7 is a sectional view corresponding to arrow VII-VII in FIG. 6.

The configuration of a helical gear 21Y according to background art will be described with reference to FIGS. 6 and 7 hereinafter. FIG. 6 is a front view of helical gear 21Y according to background art. FIG. 7 is a sectional view representing deformation in helical gear 21Y in a meshing state corresponding to arrow VII-VII in FIG. 6.

Helical gear 21 of the present embodiment shown in FIG. 3 and helical gear 21Y of background art have the same basic configuration, and differ in the configuration of opening perimeter wall 25 defining through hole H21 provided in disk 22b.

Opening perimeter wall 25 of helical gear 21Y includes an inner peripheral side face 25a located at the hub 22a side, an outer peripheral side face 25b located at the side closer to rim 22c than inner peripheral side face 25a, a first end side face 25c joining one end of inner peripheral side face 25a and one end of outer peripheral side face 25b, and a second end side face 25d joining the other end of inner peripheral side face 25a and the other end of outer peripheral side face 25b.

Inner peripheral side face 25a constitutes a portion of an arc having a radius (D11) centered about a rotation center C1 of rotation shaft 20. Outer peripheral side face 25b constitutes a portion of an arc having a radius (D12: D12>D11) centered about rotation center C1 of rotation shaft 20. First end side face 25c and second end side face 25d constitute a semicircle having a radius (D2) centered about rotation center C2.

Outer peripheral side face 25b is provided bilaterally symmetric about the intersection (P1). Therefore, through hole H21 defined by opening perimeter wall 25 takes a bilateral symmetric configuration about a phantom straight line (L1) connecting rotation center C1 and the intersection (P1).

Outer peripheral side face 25b constituting a portion of an arc having a radius (D12) centered about rotation center C1 of rotation shaft 20 is provided such that, as to the distance in the radial direction of the rotation shaft, the distance (W2) at the most leading end side spot in the direction of rotation (R1) of helical gear 21Y (the side closest to line (1) in the region surrounded by A1 in the drawing) is longest.

Upon comparing, based on FIGS. 5 and 7, the deformation in helical gear 21 at a meshing state according to the present embodiment corresponding to the configuration of FIG. 3 and helical gear 21Y according to background art shown in FIG. 6, the angle of inclination ($\alpha 1$) of helical gear 21 of the present embodiment shown in FIG. 3 can be made smaller than the angle of inclination ($\alpha 2$) of helical gear 21Y shown in FIG. 6.

Figure 13:
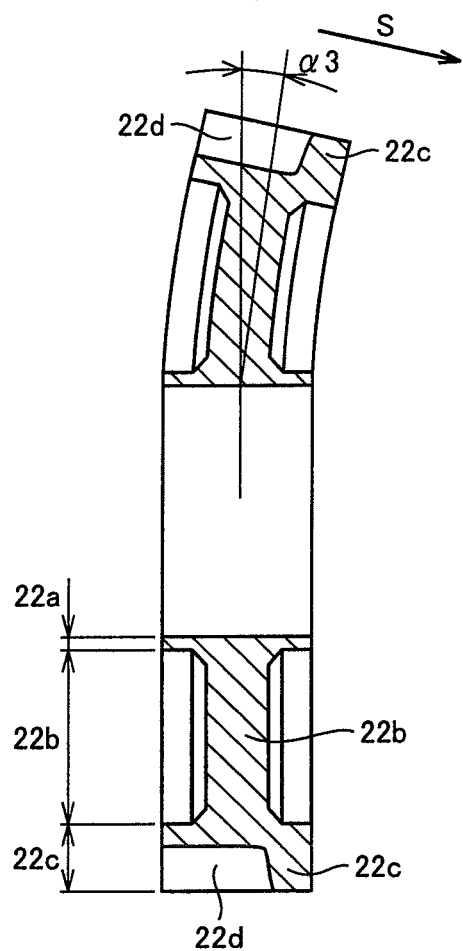
FIG. 13 is a sectional view taken along arrow XIII-XIII of FIG. 12.
Figure 14:
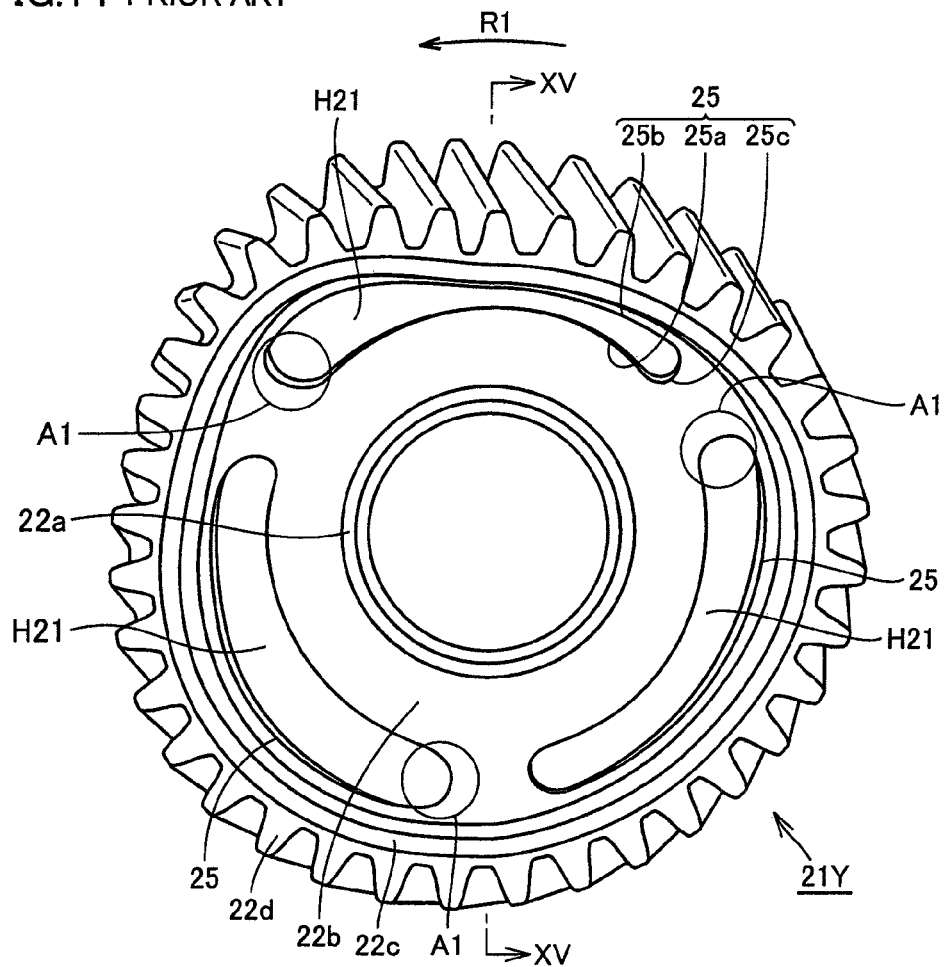
FIG. 14 is a front view representing deformation in another helical gear in a meshing state according to background art.
Figure 15:
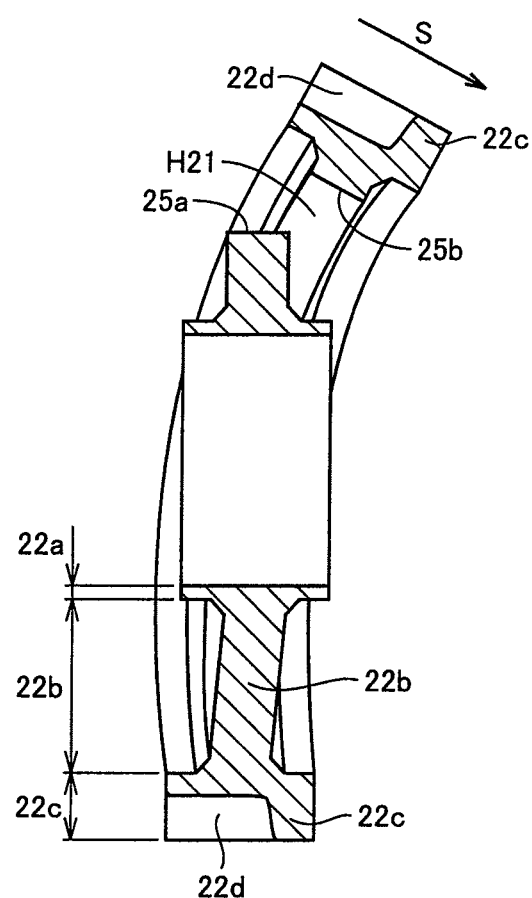
FIG. 15 is a sectional view taken along arrow XV-XV in FIG. 14.

It is to be noted that the angle of inclination ($\alpha 1$) of helical gear 21 of the present embodiment is greater than the angle of inclination ($\alpha 3$) of helical gear 21Z absent of a through hole in disk 22b shown in FIG. 13. Thus, there is established the relationship of the angle of inclination ($\alpha 2$) of helical gear 21Y>angle of inclination ($\alpha 1$) of helical gear 21>angle of inclination ($\alpha 3$) of helical gear 21Z.

Figure 8:
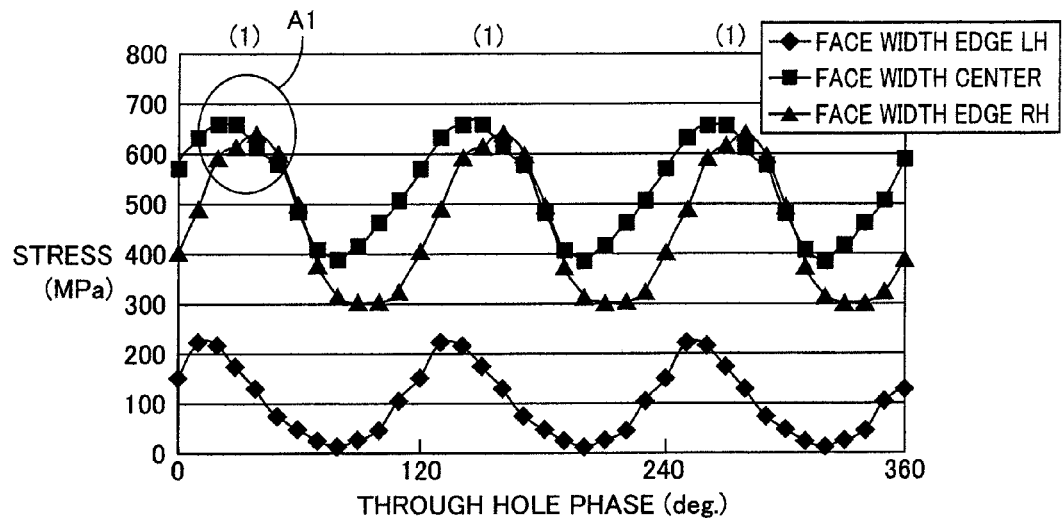
FIG. 8 represents the relationship between stress and through hole phase of the helical gear according to the present embodiment.
Figure 9:
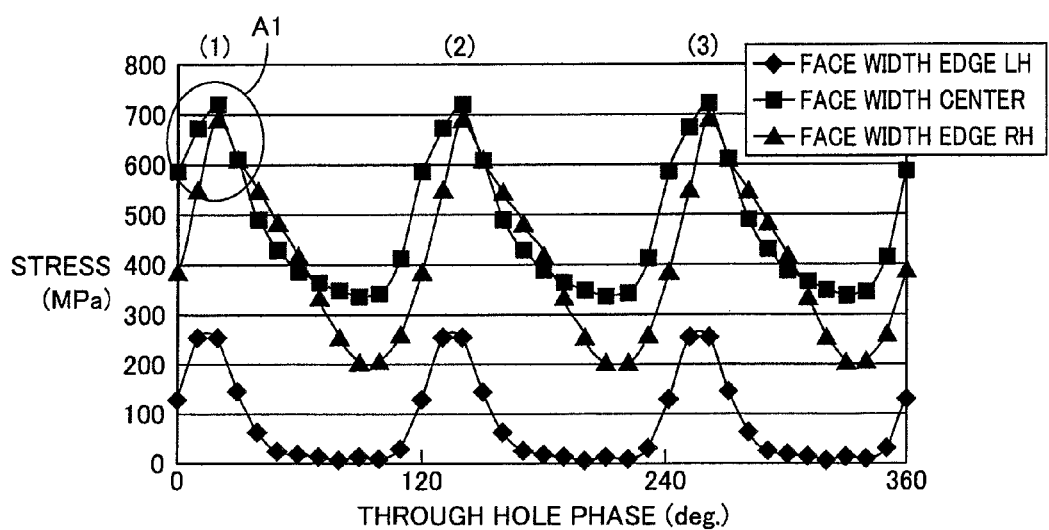
FIG. 9 represents the relationship between stress and through hole phase of the helical gear according to background art.

The relationship between the through hole phase and stress of helical gear 21 of the present embodiment and helical gear 21Y of the background art is shown in FIGS. 8 and 9, respectively. In the drawings, (1) represents the spot of the most leading end side of the through hole in the direction of rotation (R1) of helical gear 21 shown in FIGS. 3 and 6. In FIGS. 8 and 9, face width edge LH implies the teeth spot at the left side when viewed in the rotary direction of rotation (back deeper side in the drawing); the face width center implies the spot at center of the teeth when viewed in the rotary direction; and face width edge RH implies the teeth spot at the right side when viewed in the rotary direction (the fore side in the drawing).

As shown in FIG. 9, the stress at the through hole phase of helical gear 21Y of the background art exceeds 700 Mpa at the most leading end side spot in the direction of rotation (R1) of helical gear 21 (the spot of the through hole indicated by (1)).

In the case where the gear mesh at the region where the difference in rigidity is great between the through hole and the disk, great deformation occurs at the helical gear. As a result, the meshing teeth are urged against the region of great rigidity to deform. Accordingly, the meshing root is pulled to cause higher stress at the root. Therefore, it is considered that the strength at the root is degraded significantly in a gear having a through hole provided at the disk, causing generation of large stress.

In contrast, the stress at the through hole phase of helical gear 21 according to the present embodiment can be reduced to a level not exceeding 700 Mpa at the most leading end side spot in the direction of rotation (R1) of helical gear 21 (the spot of the through hole indicated by (1)).

As to the distance in the radial direction of the rotation shaft from rim 22c at the hub 22a side to outer peripheral side face 24b while the curvature of first side region 24b1 of the through hole is varied from rotation center C2, when viewed along the direction of rotation, first side region 24b1 has the distance (W2) at the most leading end side spot in the direction of rotation (R1) of helical gear 21 set longest.

Therefore, since the thickness of disk 22b gradually becomes thinner when viewed along the direction of rotation of through hole H11, the difference in rigidity at disk 22b can be made to change mildly from the end of through hole H11 towards the middle section (intersection (P1)). As a result, the deformation of the teeth being urged against the region of higher rigidity can be alleviated, allowing increase of the root stress to be suppressed.

According to the helical gear of the present embodiment, stress and noise can be suppressed, and the stress occurring at the leading end side in the direction of rotation of the through hole provided in the disk can be reduced. As a result, the performance of a gear device employing such a helical gear, as well as a transaxle including the gear device can be improved.

In the present embodiment, outer peripheral side face 24b is configured in a bilaterally symmetric manner about intersection P1. This is to obtain a similar functional advantage even in the case where the direction of rotation of the helical gear is in the opposite direction. Outer peripheral side face 24b has been described having first side region 24b1 and second side region 24b2 directly joined at an intersection P1. A portion of an arc centered about rotation center C1 may be provided between first side region 24b1 and second side region 24b2.

Other Embodiments

Figure 10:
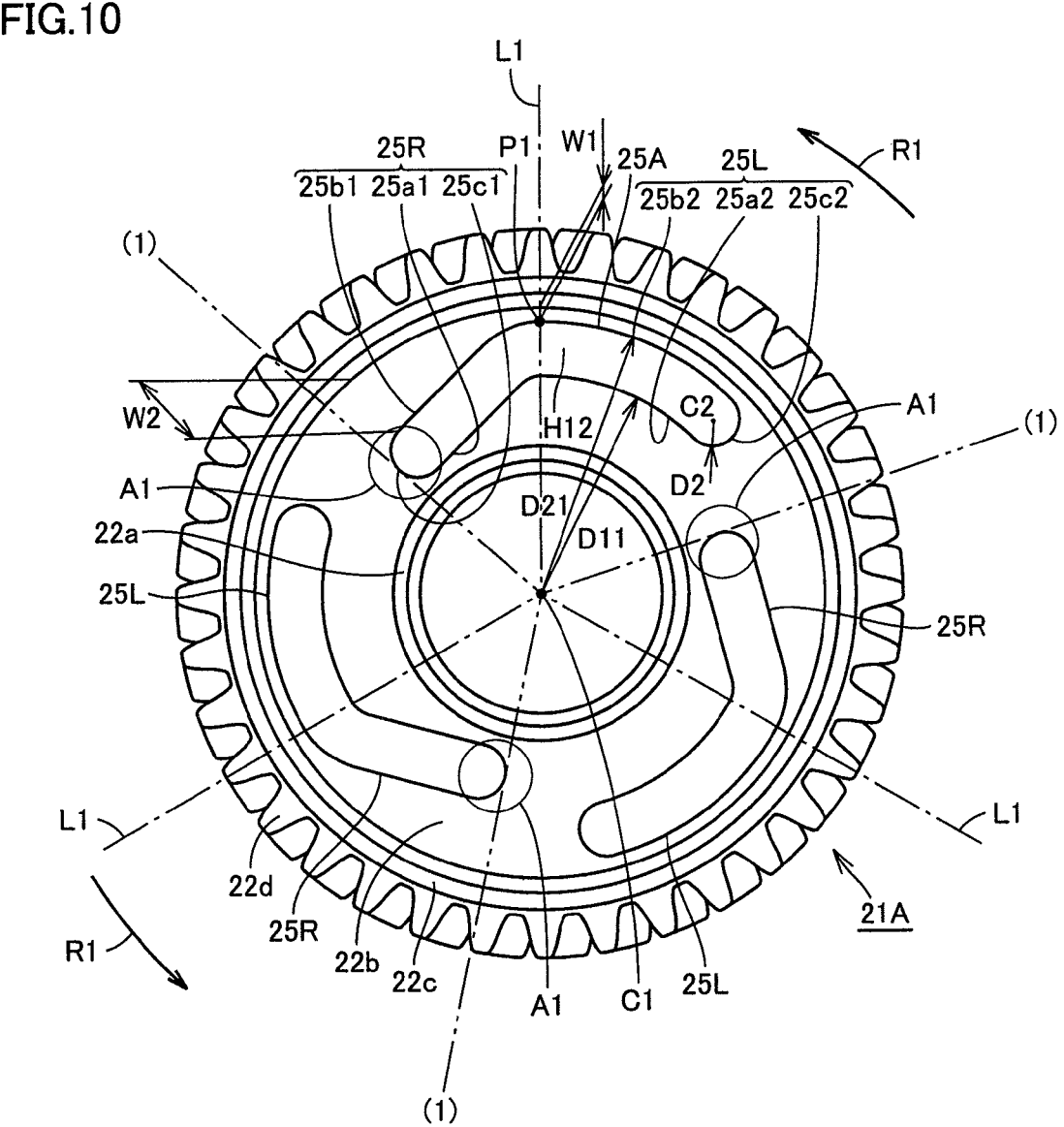
FIG. 10 is a front view showing a helical gear according to another embodiment.

According to another embodiment, a helical gear 21A having an opening perimeter wall 25A defining through hole H12, as shown in FIG. 10, may be employed. The difference between helical gear 21A and helical gear 21 of FIG. 3 differs in the configuration of the opening perimeter wall. The same or corresponding elements have the same reference characters allotted, and description thereof will not be repeated.

Opening perimeter wall 25A is provided at three sites at the pitch of 120°. Opening perimeter wall 25A includes a first opening perimeter wall 25R located at the leading end side in the direction of rotation of helical gear 21A, and a second opening perimeter wall 25L located at the trail end side in the direction of rotation of helical gear 21A. First opening perimeter wall 25R and second opening perimeter wall 25L are joined at an intersection (P1).

First opening perimeter wall 25R includes a first inner peripheral side face 25a1 located at the hub 22a side, a first outer peripheral side face 25b1 located at the side closer to rim 22c than first inner peripheral side face 25a1, and a first end side face 25c1 connecting one end of first inner peripheral side face 25a1 and one end of first outer peripheral side face 25b1.

Second opening perimeter wall 25L includes a second inner peripheral side face 25a2 located at the hub 22a side, a second outer peripheral side face 25b2 located at the side closer to rim 22c than second inner peripheral side face 25a2, and a second end side face 25c2 connecting one end of second inner peripheral side face 25a2 and one end of second outer peripheral side face 25b2.

Second inner peripheral side face 25a2 constitutes a portion of an arc having a radius (D11) centered about rotation center C1 of rotation shaft 20. Second outer peripheral side face 25b2 constitutes a portion of arc having a radius (D21: D21>D11) centered about rotation center of C1 of rotation shaft 20.

First end side face 25c1 and second end side face 25c2 constitute a semicircle having a radius (D2) centered about rotation center C2.

As to the distance in the radial direction of the rotation shaft from rim 22c at the hub 22a side to first outer peripheral side face 25b1, first outer peripheral side face 25b1 has a distance (W2) located at the most leading end side spot in the direction of rotation (R1) of helical gear 21 (the side closest to line (1) in the region surrounded by A1 in the drawing) set longer than the distance (W1) at the intersection (P1) at the tail end side. First outer peripheral side face 25b1 has a linear shape.

First inner peripheral side face 25a1 is provided substantially parallel to first outer peripheral side face 25b1. First inner peripheral side face 25a1 also has a linear shape.

Helical gear 21A can obtain, when the rotating direction is R1, a similar functional advantage since the region of first opening perimeter wall 25R is identical in condition to helical gear 21 set forth above.

Figure 11:
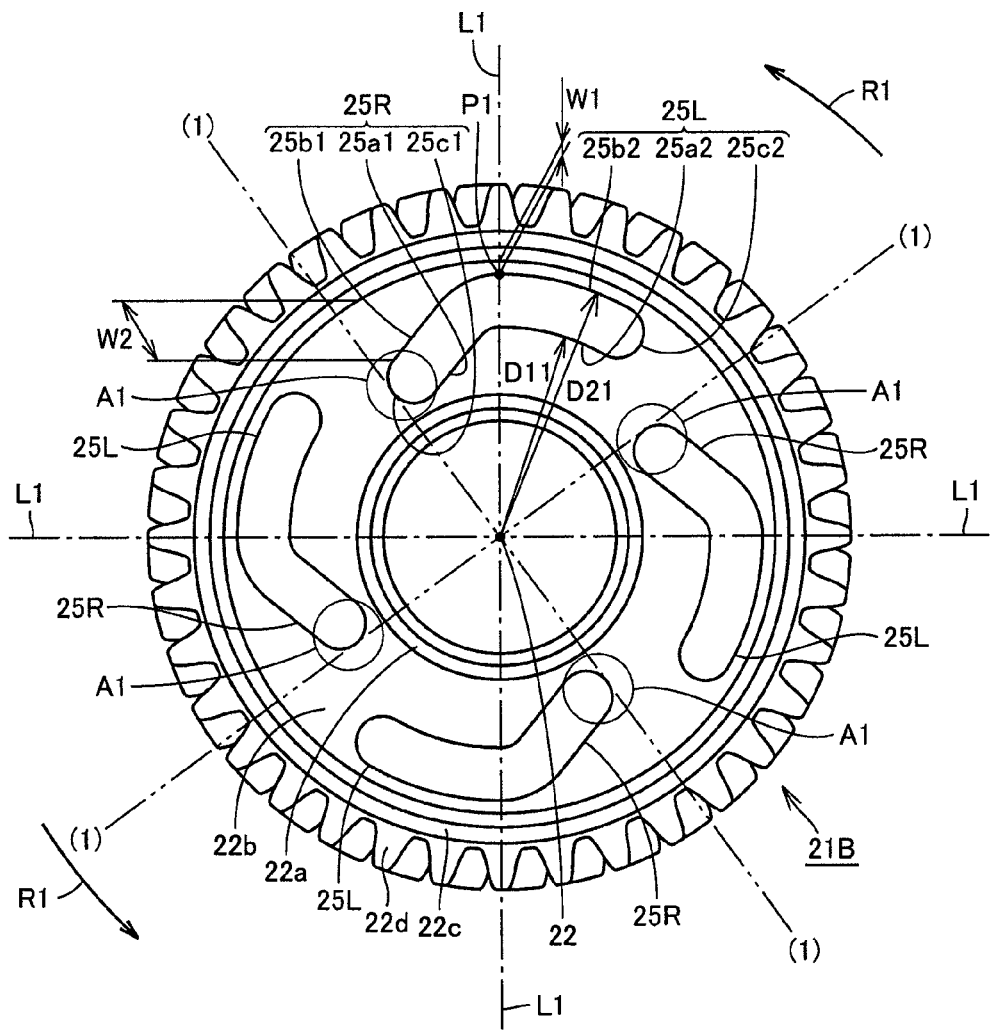
FIG. 11 is a front view of a helical gear according to still another embodiment.
Figure 12:
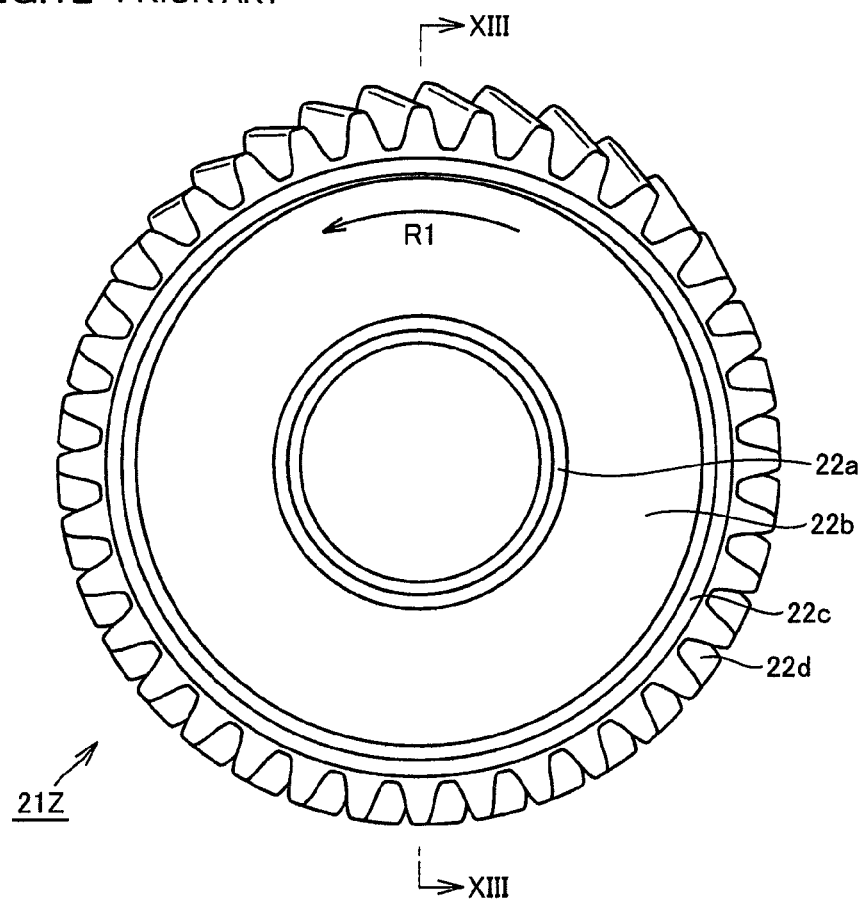
FIG. 12 is a front view representing deformation in the helical gear in a meshing state according to background art.

Although helical gear 21 shown in FIG. 3 and helical gear 21A shown in FIG. 10 have an opening perimeter wall provided at 3 sites at the pitch of 120°, the number of opening perimeter walls is not limited thereto. For example, as shown in FIG. 11, helical gear 21A of FIG. 10 may be deformed. A helical gear 21B having an opening perimeter wall 25A provided at 4 sites at the pitch of 90° may be employed. Opening perimeter wall 24 of helical gear 21 may be provided at 4 sites at the pitch of 90°. Furthermore, an opening perimeter wall may be provided at a plurality of sites at the pitch of equal interval, as necessary.

It should be understood that the embodiments and example disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

INDUSTRIAL APPLICABILITY

The present invention is particularly suitable for a gear device such as in the transmission, transfer, and the like in a vehicle.

REFERENCE SIGNS LIST 10, 20, 30 rotation shaft; 11 first gear (helical gear); 21 second gear (helical gear); 22a hub; 22b disk; 22c rim; 22d teeth; 24 opening perimeter wall; 24a inner peripheral side face; 24b outer peripheral side face; 24b1 first side region; 24b2 second side region; 24c first end side face; 24d second end side face; 21A, 21B helical gear; 25A opening perimeter wall; 25L second opening perimeter wall; 25R first opening perimeter wall; 25a1 first inner peripheral side face; 25a2 second inner peripheral side face; 25b1 first outer peripheral side face; 25b2 second outer peripheral side face; 25c1 first end side face; 25c2 second end side face; 31 third gear (helical teeth); 41, 42 meshing point; 81 final drive gear; 90 differential unit; 91 final driven gear; 100, 200 rotating electric machine; 300 planetary gear; 400 differential mechanism; C1 rotation center; H11, H12 through hole; P1 intersection.

The invention claimed is:
1. A helical gear including a hub mounted on a rotation shaft, a disk extending from said hub towards an outer side in a radial direction of said rotation shaft, and a rim provided at an outer side of said disk,
   said rim including a plurality of teeth at an outer peripheral face,
   said disk including a plurality of opening perimeter walls defining through holes provided along a perimeter of said hub,
   said opening perimeter wall including:
      an inner peripheral side face located at said hub side,
      an outer peripheral side face located at a side closer to said rim than said inner peripheral side face,
      a first end side face joining one end of said inner peripheral side face and one end of said outer peripheral side face,
      a second end side face joining the other end of said inner peripheral side face and the outer end of said outer peripheral side face, said outer peripheral side face including a first side region and a second side region located at a tail end side in direction of rotation of said helical gear relative to said first side region, as to a distance in said radial direction of said rotation shaft from said rim at said hub side to said outer peripheral side face, said first side region having the distance set greatest at the most leading end side spot in the direction of rotation of said helical gear, said first side region and said second side region provided continuously through an intersection, and a thickness of said disk gradually becoming thinner when viewed along the direction of rotation of said through hole from an end of said through hole towards said interconnection.

2. The helical gear according to claim 1, wherein the thickness of said disk gradually becomes thinner at said first side region from an end of said through hole to said interconnection.

3. The helical gear according to claim 2, wherein said first side region and said second side region are provided bilaterally symmetric about said intersection.

4. The helical gear according to claim 3, wherein said first side region is provided with a curved shape.

5. The helical gear according to claim 3, wherein said first side region is provided with a linear shape.

6. A power transmission apparatus including the helical gear defined in claim 1.

* * * * *